United States Patent [19]

Hidaka

[11] Patent Number: 4,911,532
[45] Date of Patent: Mar. 27, 1990

[54] LASER OPTICAL SYSTEM WITH A SINGLE COLLIMATING LENS AND COMBINING MEANS

[75] Inventor: Shinobu Hidaka, Osaka, Japan

[73] Assignee: Minolta Camera Kabushiki Kaisha, Osaka, Japan

[21] Appl. No.: 201,780

[22] Filed: Jun. 2, 1988

[30] Foreign Application Priority Data

Jun. 4, 1987 [JP] Japan .................. 62-138891

[51] Int. Cl.⁴ .................................................. G02B 27/10
[52] U.S. Cl. .................................. 350/174; 362/231; 362/259; 350/166
[58] Field of Search ............... 350/174, 286, 287, 321, 350/574, 166; 362/231, 259, 250

[56] References Cited

U.S. PATENT DOCUMENTS

| | | | |
|---|---|---|---|
| 3,620,592 | 11/1971 | Freeman | 350/174 |
| 4,071,809 | 11/1978 | Weiss et al. | 350/174 |
| 4,185,891 | 11/1980 | Kaestner | 362/259 |
| 4,230,902 | 10/1980 | Hug et al. | |
| 4,467,467 | 8/1984 | Wilkinson et al. | 350/174 |
| 4,545,651 | 10/1985 | Kato et al. | 350/174 |
| 4,637,679 | 1/1987 | Funato | 350/174 |
| 4,671,613 | 6/1987 | Buhrer | 350/174 |
| 4,689,780 | 8/1987 | Ohara et al. | 350/286 |
| 4,694,447 | 9/1987 | Cohen et al. | 350/174 |
| 4,701,018 | 10/1987 | Loucks | 350/174 |
| 4,723,841 | 2/1988 | Roy et al. | 350/286 |
| 4,728,965 | 3/1988 | Kessler et al. | |
| 4,787,710 | 11/1988 | Durell | 350/286 |

FOREIGN PATENT DOCUMENTS 201319 3/1985 Japan .

Primary Examiner—Jon W. Henry
Attorney, Agent, or Firm—Price, Gess & Ubell

[57] ABSTRACT

A laser optical system is disclosed which has light source units disposed on a substrate for an assembly incorporating therein a receiving medium such as a photosensitive film. One collimating lens unit and a plurality of semiconductor lasers for emitting laser beams of mutually different wavelengths are attached to the base of the light source unit. The laser beams are superposed one on top of another through the medium of dichroic prisms of dichroic mirrors and the superposed laser beams are caused to impinge on the collimating lens. By fine adjusting units, the laser beams can be moved for fine adjustment in three-dimensional directions. By adjusting the positions of the semiconductor lasers with the finely adjusting means relative to the collimating lens unit, the positions of the optical axes of the laser beams and the diameters of the beams can be easily adjusted. The light source units are movable along the assembly so as to permit easy adjustment of the position at which the superposed laser beams from the light source impinge on the receiving medium.

8 Claims, 3 Drawing Sheets

LASER OPTICAL SYSTEM WITH A SINGLE COLLIMATING LENS AND COMBINING MEANS

BACKGROUND OF THE INVENTION

1. Field of the Invention:

This invention relates to a laser optical system for use in an image forming device for writing an image on a photosensitive recording medium by exposure of the recording medium to a plurality of laser beams of different wavelengths.

2. Description of the Prior Art:

Japanese Patent Laid-Open SHO No. 60(1985)-201,319 discloses a laser optical system for incorporation in an electrophotographic color printer. This printer comprises a printer proper provided in the interior thereof with a photoconductive unit and a laser source unit. This unit incorporates therein three semiconductor lasers which are modulated in accordance with the input information and are caused to emit laser beams of mutually different wavelengths. Collimating lenses are disposed in front of the semiconductor lasers for producing parallel beams of a prescribed diameter from the laser beams. The laser beams which have passed through the lenses are scanned with a polygon mirror, and then caused to impinge on the photoconductor. As the result, an image conforming with electric signals indicative of the aforementioned input information is written in an electrophotographic recording medium.

U.S. Pat. No. 4,728,965 discloses a laser printer which is provided with three separate channels for printing a color image on a receiving medium such as a photosensitive film. These channels are severally provided with gas lasers for emitting lasers of specific wavelengths. A beam combined receives the light beams from the three channels and combines them to form a combined beam spot. The combined beam spot is relayed to a polygon mirror which scans the beam onto a receiving medium or a recording medium.

A laser optical system, which has been considered by the inventor, in a laser printer possessing a plurality of semiconductor lasers for the purpose of writing an image conforming with electric signals indicative of input information is illustrated in schematic form in FIG. 5.

The laser printer illustrated comprises three semiconductor lasers 11, 12, and 13, which are modulated in accordance with printed information by a controller (not shown) and caused to emit laser beams 11a, 12a, and 13a of mutually different wavelengths. In front of these semiconductor lasers 11 to 13 are disposed collimating lenses 14 to 16 which produce a bundle of parallel beams from these laser beams. The laser beam emitted from the semiconductor laser 11 and relayed by the collimating lens 14 is reflected by a reflecting prism 17 and is superposed in a synthetic dichroic prism 18 on the laser beam from the semiconductor laser 12. On the superposed laser beams, the laser beam from the semiconductor laser 13 is further superposed similarly in the synthetic dichroic prism. The three laser beams thus superposed are then caused to impinge on a polygon mirror 20 having a multiplicity of facet mirrors formed on the peripheral surface, to be scanned thereon. The scanned beam is caused to impinge on a photosensitive recording medium 24 such as a photosensitive film by means of a fθ lens 21, a folding mirror 22, and a window 23. This photosensitive film 25 is conveyed between an imaging drum 25 and two conveyor rollers 26 pressed against the drum 25 and forwarded to a developing device (not shown). To sense the position for starting the scanning operation, a mirror 27 is interposed between the fθ lens 21 and the folding mirror 22. The beam of light reflected by the mirror 27 is detected by a receiving sensor 28.

In the laser optical system illustrated, since three collimating lenses 14 to 16 are disposed to serve as many semiconductor lasers 11 to 13, these collimating lenses 14 to 16 must be disposed at fixed positions relative to the respective semiconductor lasers 11 to 13 and adapted to swing within fixed angles. Further, the reflecting prism 17 and the two dichroic prisms 18, 19 which jointly serve the purpose of superposing the three laser beams must be disposed at fixed mutual positions and with fixed angles. During the production and the maintenance of the laser printer, therefore, the adjustment of the positions and the angles mentioned above calls for much time and labor. Particularly the mutual positional adjustment of the two prisms is an extremely difficult optical adjustment for superposing one straight line over another straight line. This optical adjustment coupled with the adjustment of collimating lenses is difficult to attain with the conventional technique.

SUMMARY OF THE INVENTION

An object of this invention is to provide a laser optical system which is provided with a plurality of semiconductor lasers and one collimating lens for collimating the laser beams emitted from the semiconductor lasers in such a pattern that the adjustment of the mutual optical positions of the laser beams and the collimating lens can be effected with ease.

Another object of this invention is to provide a laser optical system which is provided with a fine adjusting device interlocked with a plurality of semiconductor lasers and adapted to effect an adjustment of the positions of the semiconductor lasers in three-dimensional directions.

Yet another object of this invention is to provide a laser optical system which comprises an optical assembly provided with a polygon mirror and a light source unit incorporating therein a plurality of semiconductor lasers and one collimating lens, with the light source unit adapted to be moved relative to the assembly.

In accordance with the present invention, there is provided a laser optical system for the projection of a plurality of laser beams of mutually different wavelengths on a receiving medium, which comprises: a plurality of laser diodes for emitting the plurality of laser beams, means for retaining the laser diodes in such a manner as to permit independent positional adjustment thereof, one collimating lens for collimating the laser beams, synthesizing means for combining the laser beams emitted from the laser diodes into one laser beam and causing the combined laser beam to impinge on the collimating lens, means for causing the combined laser beam which has passed through the collimating lens to be conveyed in the direction of the receiving medium, and a base adapted to retain the laser diodes, the retaining means, the collimating lens and the synthesizing means integrally thereon and disposed so as to permit positional adjustment of its own relative to the conveying means.

In accordance with the present invention, there is provided a laser optical system for the projection of a plurality of laser beams of mutually different wavelengths on a receiving medium, which comprises: a plurality of laser diodes for emitting the plurality of laser beams, one collimating lens for collimating the laser beams, synthesizing means for combining the laser beams emitted from the laser diodes into one laser beam and causing the combined laser beam to impinge on the collimating lens, and a base adapted to retain the laser diodes, the collimating lens, and the synthesizing means integrally thereon.

The optical axes of the plurality of laser beams relative to the sole collimating lens can be easily adjusted by the use of the fine adjusting unit. Further, the position at which the superposed laser beams impinge on the receiving medium can be easily adjusted by moving the light source unit. The laser optical system of the present invention is optimally utilized where a colored image is formed on a photosensitive film as a consequence of the superposition of two or more laser beams.

DESCRIPTION OF THE PREFERRED EMBODIMENTS

Figure 1:
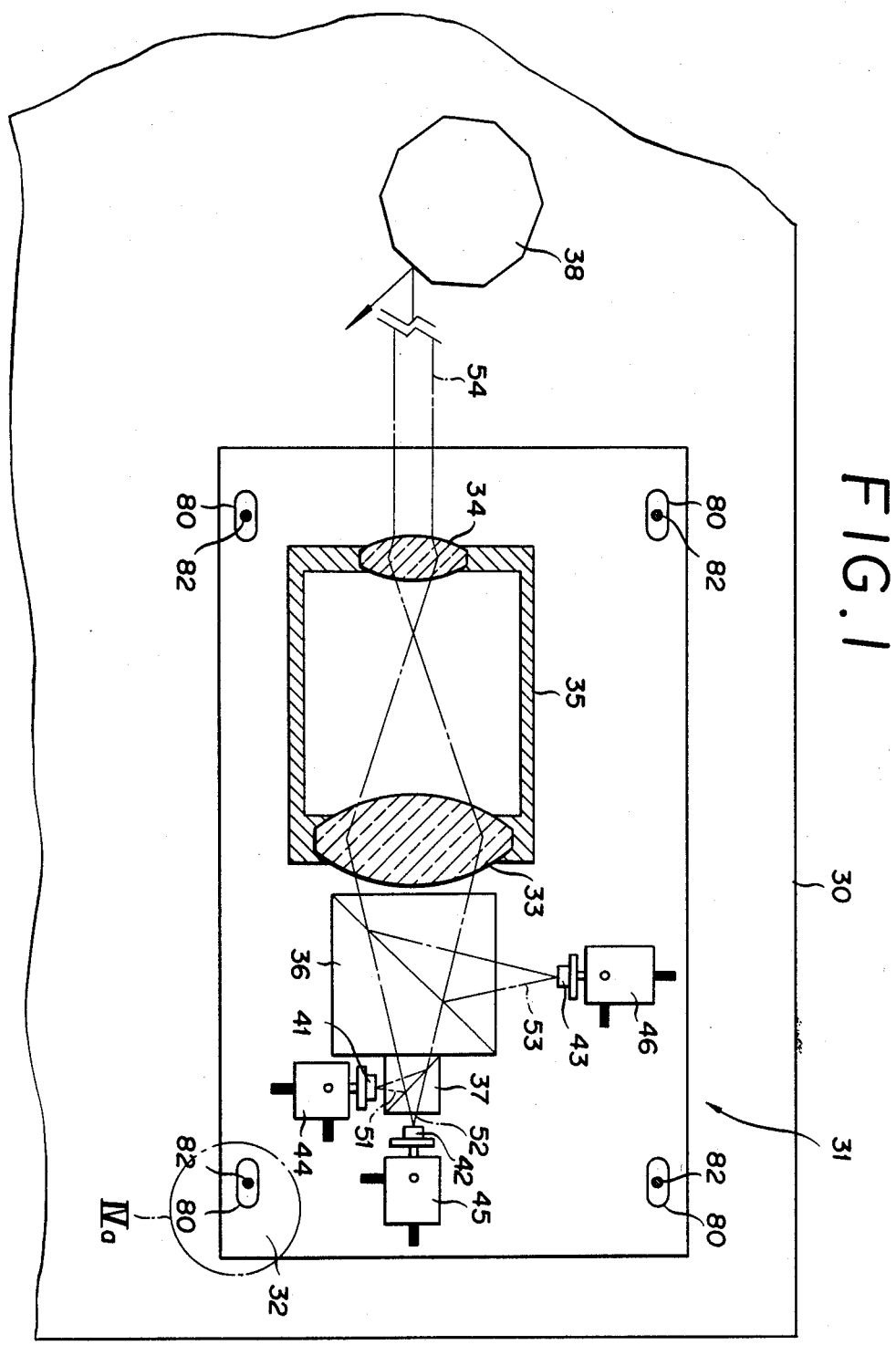
FIG. 1 is a partially cutaway plan view illustrating a typical laser optical system as one embodiment of the present invention.

FIG. 1 mainly illustrates the part of a light source unit in a laser optical system embodying this invention for use in the laser printer.

On an optic module substrate 30, a light source unit 31 adapted to move freely on the surface of the substrate 30 is disposed. To a base 32 of this light source unit 31, a collimating lens 35 on which two biconvex lenses 33, 34 are fixed is attached. A synthetic dichroic prism 36 located on the incident light side of this collimating lens 35 is fixed on the aforementioned base 32. A synthetic dichroic prism 37 is fixed on the base 32 as juxtaposed to the dichroic prism 36. Inside these prisms 36, 37, dichroic filters (not shown) can be provided.

A semiconductor laser (laser diode) 41 for projecting a laser beam perpendicularly to the incident surface of the dichroic prism 37 is attached to the base 32 through the medium of a fine adjusting unit 44 serving to adjust the position of the semiconductor laser 41 in the three-dimensional directions. Further, a semiconductor laser 42 for projecting a laser beam perpendicularly to the incident surface of the dichroic prism 37 is attached to the base 32 through the medium of a fine adjusting unit 45 serving to adjust the position of the semiconductor laser 42 in the three-dimensional directions. A bundle of rays 51 emitted from the semiconductor laser 41 and a bundle of rays 42 emitted from the semiconductor laser 42 perpendicularly to the bundle of rays 51 are superposed one on the other in the dichroic prism 37 and caused to impinge on the dichroic prism 36.

A semiconductor laser 43 for projecting a laser beam on the dichroic prism 36 perpendicularly to the bundle of rays produced by the superposition of the bundles of rays 51, 52 is attached to the base 32 through the medium of a fine adjusting unit 46 adapted to adjust the position of the semiconductor laser 43 in the three-dimensional directions. In the dichroic prism 36, therefore, another bundle of rays 53 are superposed on the bundles of rays 51, 52 which have been superposed in the dichroic prism 37.

By a controlling device (not shown) serving to issue electric signals modulated in accordance with image information, the semiconductor lasers 41 to 43 are caused to emit laser beams of mutually different wavelengths. A bundle of rays 54 produced by the superposition of all the bundles of rays in the dichroic prism 36 is caused to impinge on the sole collimating lens system 35 and transformed into a bundle of parallel rays and caused to impinge on a polygon mirror 38 disposed on the optics module substrate 30. The bundle of rays deflected and scanned by this polygon mirror 38 is brought to a photosensitive film (not shown) to form an image on the photosensitive film.

Figure 2:
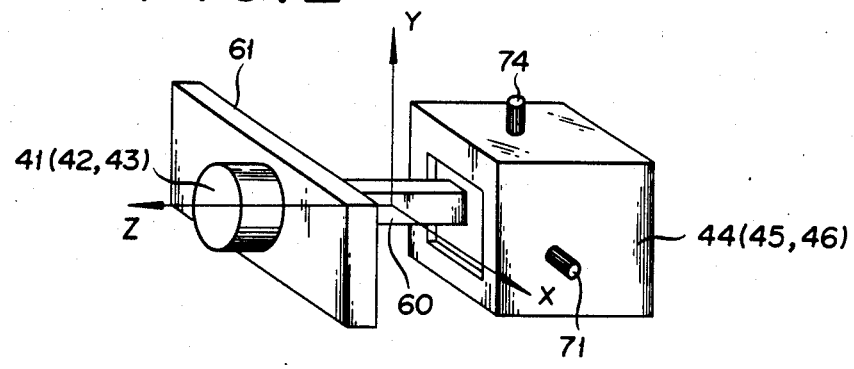
FIG. 2 is a perspective view in magnified form of a fine adjusting unit illustrated in FIG. 1.

The semiconductor lasers 41 to 43 are severally fixed, as illustrated in FIG. 2, to a fitting plate 61 at the leading end of an arm projected each from the fine adjusting units 44 to 46. The semiconductor lasers 41 to 43 are finely adjusted in the three-dimensional directions by the movement of the arms 60 in the direction of X axis, the direction of Y axis, and the direction of Z axis.

Figure 3A:
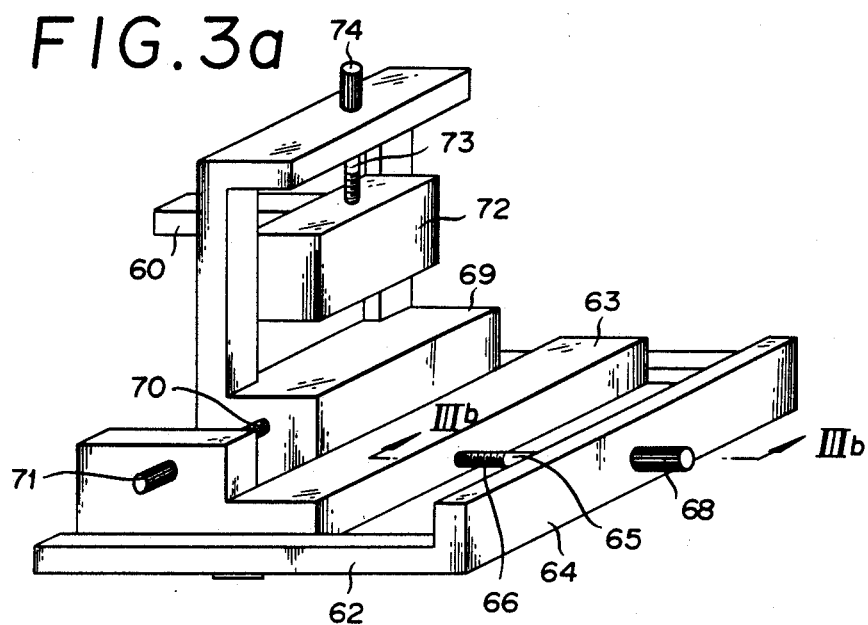
FIG. 3a is a perspective view illustrating the internal structure of the fine adjusting unit illustrated in FIG. 2.
Figure 3B:
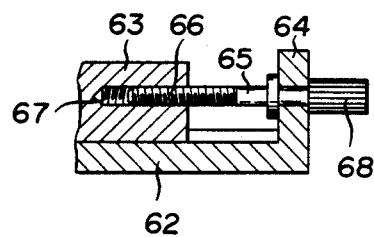
FIG. 3b is a cross section taken through FIG. 3a along the line IIIa—IIIa.
Figure 4A:
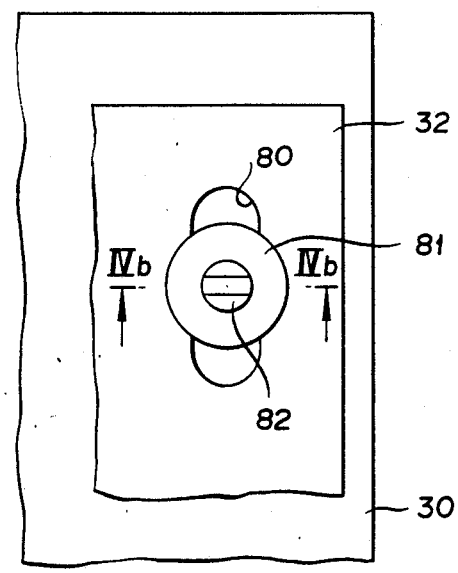
FIG. 4a is a plan view illustrating in magnified form the part IVa of FIG. 1.
Figure 4B:
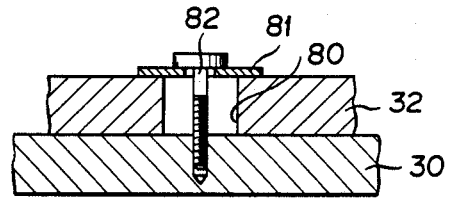
FIG. 4b is cross section taken through FIG. 4a along the line IVb—IVb.
Figure 5:
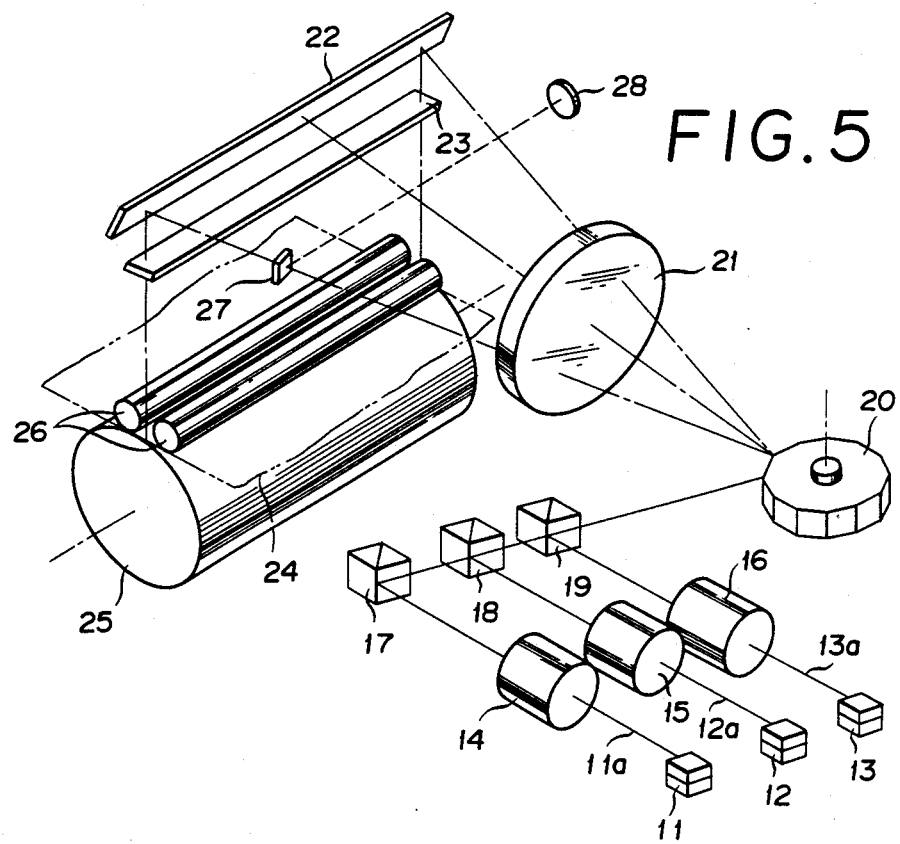
FIG. 5 is a perspective view illustrating the schematic form a laser optical system which has been considered by the inventor.

FIG. 3a illustrates the inner structure of the fine adjusting units 44 to 46 illustrated in FIG. 2. On a supporting base 62 incorporated in each of the fine adjusting units, a movable base 63 is disposed so as to be freely reciprocated in the direction of a Z axis mentioned above. A male screw part 66 of a feed screw attached rotatably to a flange part 64 of the supporting base 62 is meshed with a female screw part 67 formed in the movable base 63 as illustrated in FIG. 3b. By imparting a rotation to the feed screw 65 with a knob 68 formed at the leading end thereof, the movable base 63 is reciprocated in the direction of the Z axis to fix the positions of the semiconductor lasers 41 to 43 relative to the dichroic prisms and effect the adjustment of the diameter of the bundle of rays 54.

On the movable base 63, a movable base 69 is disposed so as to be freely reciprocated in the direction of a X axis. A feed screw 70 similar to the feed screw 65 is rotatably attached to the movable base 63. This feed screw 70 is meshed with a matched thread formed in the movable base 69. By imparting a rotation to the feed screw 70 with a knob 71 thereof, the movable base 69 is reciprocated in the direction of the X axis to effect adjustment of the horizontal positions of the semiconductor lasers 41 to 43 relative to the dichroic prisms.

On the movable base 69, a movable base 72 is disposed so as to be freely reciprocated in the direction of a Y axis. To this movable base 72, the arm 60 shown in FIG. 2 is fixed. Further to the movable base 69, a feed screw 73 similar to the feed screw 65 is rotatably attached. This feed screw 73 is meshed with a matched thread formed in the movable base 72. By imparting a rotation to the feed screw 73 with a knob 74, therefore, the movable base 72 is moved in the vertical direction.

During the assembly of the light source unit 31 and during the replacement of such component parts as semiconductor lasers within the light source unit 31, the superposition of the bundles of rays 51, 52, and 53 can be adjusted by moving the arm 60 in the directions of the X axis and the Y axis by means of the knobs 71, 74. The manner of this superposition can be observed by causing the bundle of rays 54 which has passed through the collimating unit 35 to be projected on a screen (not shown), for example. Optionally, this observation may be accomplished by converging the bundle of parallel rays 54 into spots of rays with such an optical system as a single lens and examining the manner of superposition of these spots of rays.

Further by moving the arm 60 in the direction of the Z axis with the knob 68, the distances of the semiconductor lasers relative to the dichroic prisms are varied to permit adjustment of the diameters of the laser beams.

In each of the four corners of the base 32 of the light source unit 31, an oblong hole 80 extended in the direction of the Z axis is formed. A set screw 82 provided with a waster 81 is passed through the oblong hole 8 and meshed with a matched thread formed in the substrate 30. The set screws 82 have a diameter smaller than the width of the oblong holes 80. While these set screws 82 are kept loose, the light source unit 31 is given a necessary positional adjustment in the horizontal direction on the substrate 30. When the set screws 82 are tightened after completion of the positional adjustment, the light source units 31 are immobilized at prescribed positions.

By setting the base 31 at the prescribed position thereof on the module substrate 30, the position at which the bundle of rays 54 passed through the collimating 35 unit and are relayed via the polygon mirror 38 to impinge on the receiving medium such as a photosensitive film can be adjusted with ease. Further, the laser optical system of the present invention enjoys an overall size reduction because all of the laser beams can be collimated with only one collimating lens.

This invention is not limited to the illustrated working examples. It permits various alterations. For example, conventional dichroic mirrors may be used in place of the dichroic prisms 36, 67 and 2 or 4 or more semiconductor lasers may be used in place of three semiconductor lasers.

What is claimed is:

1. A laser optical system for the projection of a plurality of laser beams of mutually different wavelengths on a receiving medium, which comprises:
   a plurality of laser diodes for emitting said plurality of laser beams,
   means for retaining said laser diodes in such a manner as to permit independent positional adjustment thereof,
   a collimating lens for collimating said laser beams,
   synthesizing means for combining said laser beams emitted from said laser diodes into one laser beam and causing the combined laser beam to impinge on said collimating lens, conveying means for conveying said combined laser beam having passed through said collimating lens to said receiving medium, and
   a base adapted to retain said laser diodes, said retaining means, said collimating lens, and said synthesizing means integrally thereon and disposed so as to permit positional adjustment of said base relative to said conveying means.

2. A laser optical system according to claim 1, wherein said retaining means retains said laser diodes in such a manner as to permit positional adjustment thereof in three mutual perpendicular directions.

3. A laser optical system according to claim 1, wherein the number of said laser diodes is 3 and said synthesizing means comprises a first synthesizing member for combining two laser beams emitted from the first and second laser diodes into one laser beam and a second synthesizing member for combining the combined laser beam from said first synthesizing member and a laser beam from the third diode into one laser beam.

4. A laser optical system according to claim 3, wherein said first and second synthesizing members are dichroic prisms.

5. A laser optical system according to claim 3, wherein said first and second synthesizing members are dichroic optical members.

6. A laser optical system for the projection of a plurality of laser beams of mutually different wavelengths on a receiving medium, which comprises:
   a plurality of laser diodes for emitting said plurality of laser beams,
   one collimating lens for collimating said laser beams,
   synthesizing means for combining said laser beams emitted from said laser diodes into one laser beam and causing the combined laser beam to impinge on said collimating lens, and
   a base adapted to retain said laser diodes, said collimating lens, and said synthesizing means integrally thereon.

7. A laser optical system according to claim 6, wherein said laser diodes are disposed on said base in such a manner as to permit independent positional adjustment thereof.

8. A laser optical system according to claim 6, which further comprises conveying means for conveying said combined laser beam having passed through said collimating lens to said receiving medium and said base is disposed so as to permit positional adjustment thereof relative to said conveying means.

* * * * *